(No Model.) 3 Sheets—Sheet 2.
W. F. MATTES & J. F. LEWIS.
LUBRICATOR.
No. 456,422. Patented July 21, 1891.
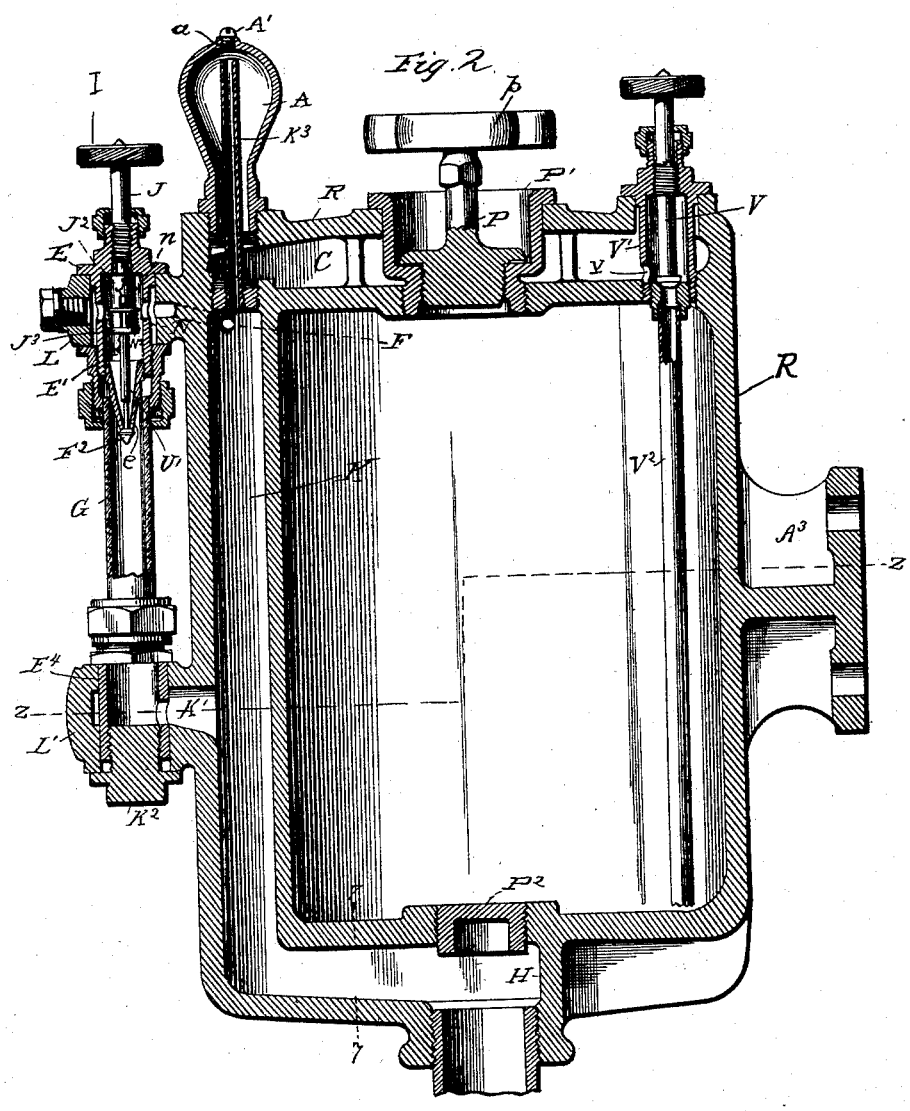
Witnesses
Inventor
William F. Mattes.
John F. Lewis
By their Attorneys (No Model.) 3 Sheets—Sheet 3.
W. F. MATTES & J. F. LEWIS.
LUBRICATOR.
No. 456,422. Patented July 21, 1891.
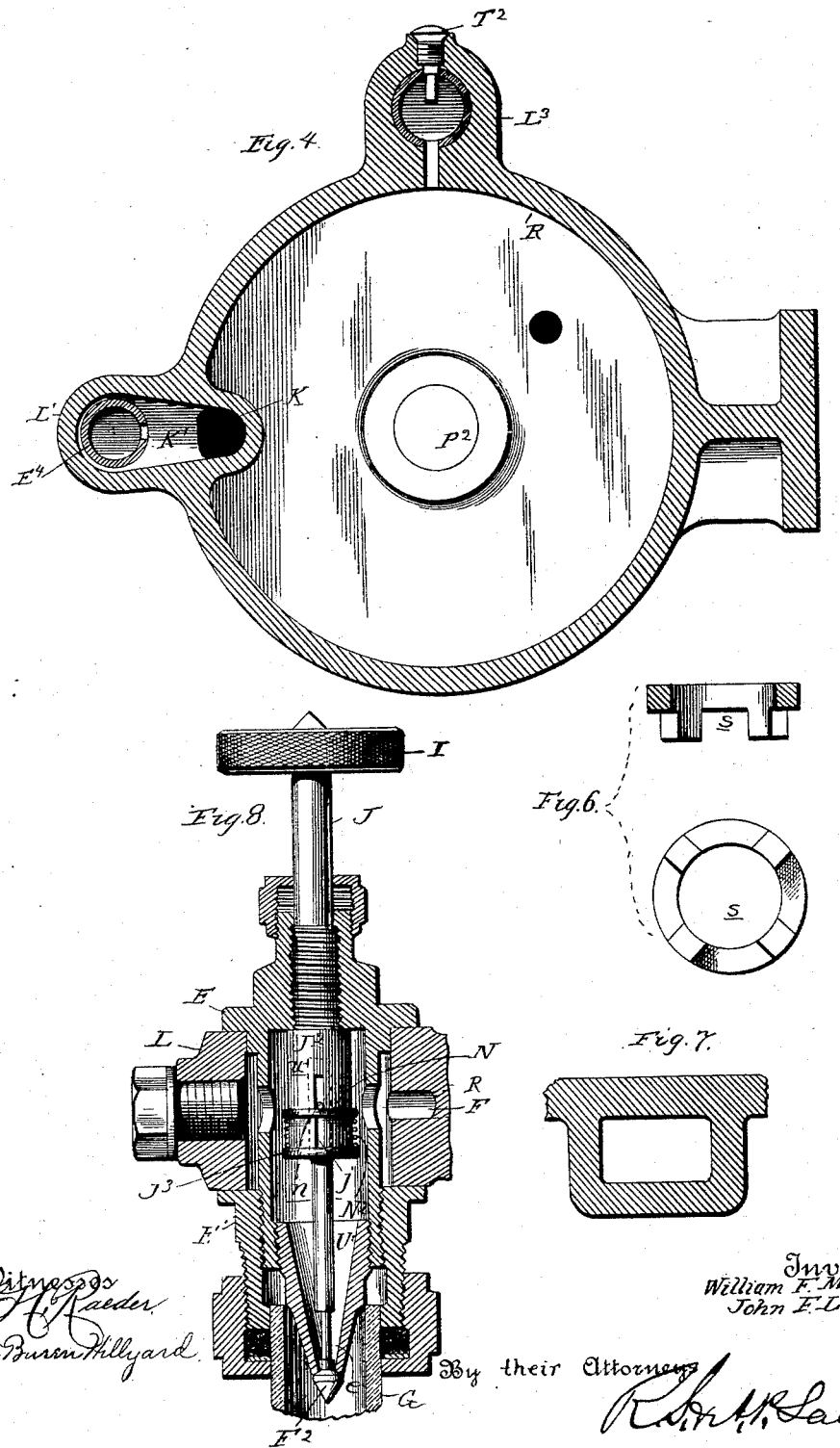
Witnesses
Inventors.
William F. Mattes.
John F. Lewis.
By their Attorneys

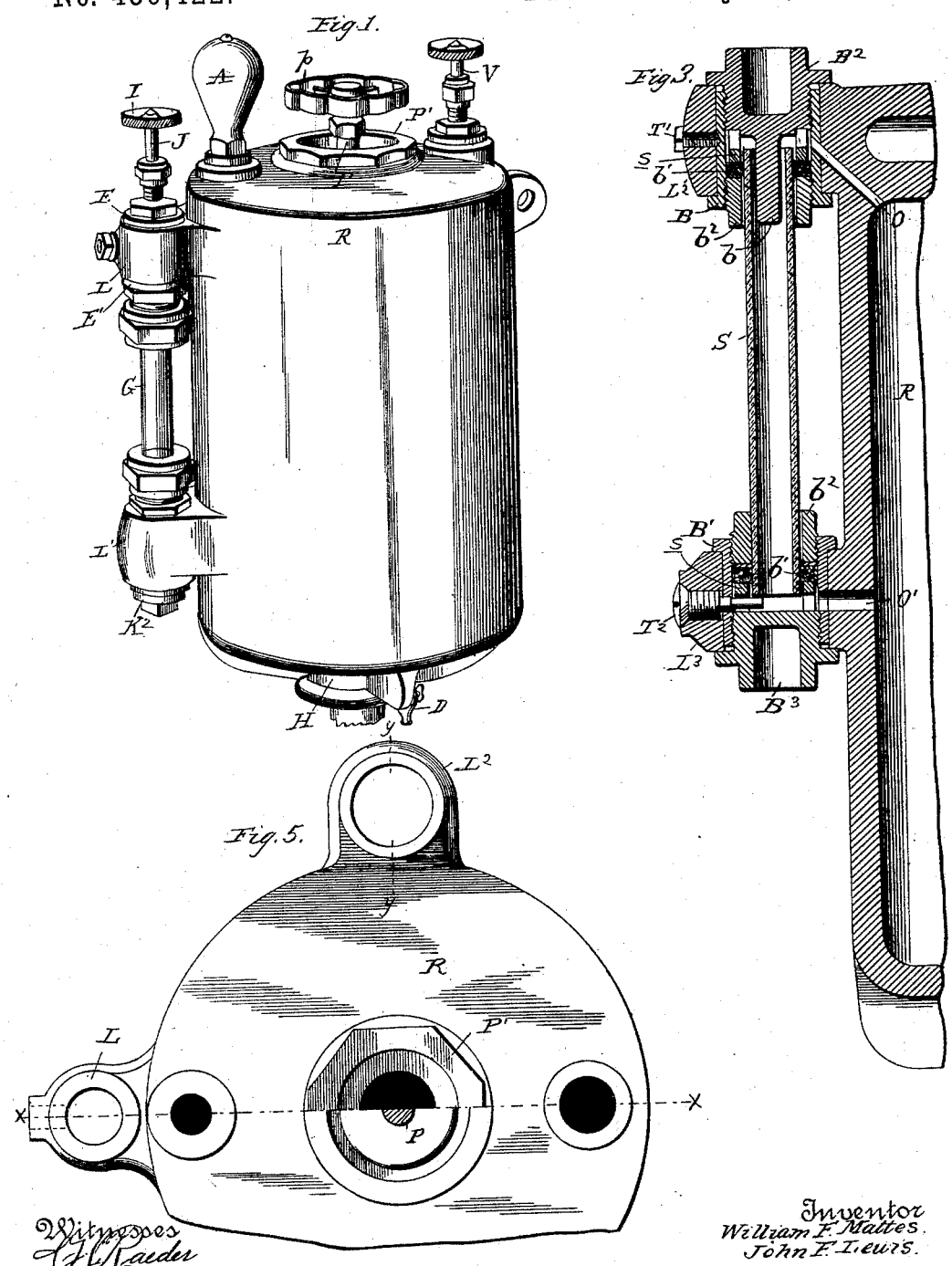

UNITED STATES PATENT OFFICE.

WILLIAM F. MATTES AND JOHN F. LEWIS, OF SCRANTON, PENNSYLVANIA, ASSIGNORS TO WILLIAM F. MATTES, TRUSTEE, OF WEST SUPERIOR, WISCONSIN.

LUBRICATOR.

SPECIFICATION forming part of Letters Patent No. 456,422, dated July 21, 1891.

Application filed May 20, 1889. Serial No. 311,402. (No model.)

*To all whom it may concern:*

Be it known that we, WILLIAM F. MATTES and JOHN F. LEWIS, citizens of the United States, residing at Scranton, in the county of Lackawanna and State of Pennsylvania, have invented certain new and useful Improvements in Lubricators; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to displacement-lubricators, and has for its object to provide a large area of surface for condensing the steam, the water of condensation being conveyed to the bottom of the cup through the lubricant without commingling therewith, and to devise novel means for connecting the several fittings to the cup, whereby they can readily be replaced or removed for cleansing.

A further object of the invention is to improve the general construction and increase the usefulness and efficiency of this class of devices and to render the parts easily accessible for cleansing or making repairs.

The improvement consists of the novel features and peculiar construction and combination of the parts, which will be hereinafter more fully described and claimed.

In the drawings, Figure 1 is a perspective view of a lubricator embodying our invention; Fig. 2, a vertical central sectional view on the line X X of Fig. 5; Fig. 3, a sectional detail on the line Y Y of Fig. 5; Fig. 4, a cross-section on the line Z Z of Fig. 2; Fig. 5, a top plan view, part being broken away, of the lubricator, showing the fittings removed; Fig. 6, a bottom plan and a cross-section of the stool on which the gage-glass is supported; Fig. 7, a detail section on the line 7 7 of Fig. 2, showing the shape of the steam-passage in the base of the oil-cup. Fig. 8 is an enlarged view of the upper lug and fittings shown in Fig. 2.

The oil reservoir or cup R is provided at its upper end with a condensing-chamber C, and at one side and on its base with the steam-passage K, which communicates at its upper end with said condensing-chamber C, and at its lower end with the threaded shank H, by which attachment is had with the steam-pipe. A dome is secured to the top of the cup in line with the steam-passage K, and forms an air-chamber A, which also serves to condense the steam. The dome A is provided to collect the air which is given off by the condensing process, at a convenient point from which it can escape, as by means of the plug A', which is unscrewed a proper distance to uncover the groove $a$ in the side thereof. When the air has escaped, the plug A' is screwed home and the dome acts with chamber C as a condensing-chamber. The tube $K^3$, fastened in the upper end of the passage K, extends to within a short distance of the top of the air-chamber. The nipple P', screwed in the inner wall of the condensing-chamber, flares at its upper end and extends through the outer wall of said chamber C and has an exterior flange, which overlaps and bears on the said outer wall. This nipple extends across the condensing-chamber, and by reason of its outer flaring end admits of the lubricant being readily poured through the same when filling the cup, and its lower portion is closed by the plug P, which is screwed therein, and which has an outer flange that bears on the upper end of the contracted portion of said nipple. The plug $P^2$ closes an opening in the bottom of the cup opposite the shank H, which opening is provided to facilitate the casting of the cup or vessel, as it enables the molder to carry his core through and obtain a bearing or support therefor at both ends.

The valve-case V', passed through the outer wall and screwed into the inner wall of the condensing-chamber C, has an opening $v$ in its side which communicates with the said chamber C and has a tubular valve-seat threaded into its lower end. The valve-stem V, having a valve at its lower end, is screw-threaded in the upper end of the valve-case, and when turned down to its extreme limit shuts off communication between the condensing-chamber C and the cup through the tube $V^2$, which is secured to the lower end of the valve-case V' and extends to within a short distance of the bottom of the cup.

The sight-glass G is secured at its ends to the fittings E and E⁴, which are fastened to the lugs L and L', that are formed in one piece with the cup. The fitting E is passed through the lug L and is clamped to it by the nut E', which is threaded to the lower end of the fitting E, both E and E' being provided with flanges bearing upon the lug L for that purpose. In a similar manner the fittings E⁴ and K² are fastened to the lower lug L'. A conical tubular duct e, threaded to the interior lower end of the fitting E, extends within the glass G and conveys the oil to and forms a seat for the valve F². This valve is supported by the rod U', which enters a hole u in the bottom of the regulating valve-stem J. This stem is slitted at j a suitable distance up from the bottom to receive the pin n, which passes through the eye in the upper end of the rod U'. This pin rests upon a loose collar N. The collar rests upon the spring N², and the spring upon the fixed collar J³. It will be observed that this method of attachment gives to the valve F² the same freedom to rise within certain limits as was secured by the arrangement of yoke shown in the previous patent, and also that the pin n compels the valve to revolve whenever the hand-wheel I is turned.

An important improvement in the method shown of attaching the various fittings to the body of the lubricator consists in the facility with which the parts fastened to the lugs L and L' are brought into proper axial relationship, and also that by this method of clamping to the lugs the cutting of screw-threads in the latter is avoided. The arrangement also facilitates the assembling of parts. The lower part of the stem J is enlarged in diameter, as shown at J², and the length of the rod U' is so proportioned that the enlarged part of the stem J² will strike against the under side of the fitting E when the stem J is drawn upward before any dangerous stress can be brought upon the rod U'.

Referring to Fig. 3, the fittings B and B' at the top and bottom of the gage-glass S, respectively, are secured to the lugs L² and L³ in very much the same way as those just described for the glass G. The oil or water within the reservoir, as the case may be, has free access to the glass S at both top and bottom by means of the small passages O and O'. To prevent the packings at each end of the glass from filling up these passages, a small stool s is interposed. The passage O passes upward diagonally to the top of the glass in order that the exposed part of the glass S may extend as nearly as practicable to a level with the top of the oil-reservoir R. The fittings B and B' are slipped in the openings in the lugs L² and L³ from the inner ends, and are held in place by the plugs B² and B³, respectively, which are screwed into the fittings B and B' through the outer ends of the said openings in the lugs, the fittings and plugs being provided with outer flanges which support them in the said openings. The packing b' is held between the stool s and the collar b², which latter is screwed into the open end of the fittings and surrounds the glass S, the packing being compressed by screwing the collar in the fitting as far as consistent. The screw-plug B² has an extension b running down into the top of the glass S to fill up the space, in order that when the lubricator is opened for refilling very little oil shall be imprisoned within the upper part of the glass and be thereby blown out and wasted. The set-screw T' serves to hold the fitting B in proper relation to the hole O. An extension of the screw-plug T² serves the double purpose of sustaining the glass S and of keeping the stool s in proper position relatively to the passage O'. A drain-cock D is provided in the bottom of the oil-reservoir R for use in the usual manner.

The operation of the lubricator is as follows: Attachment is made to the steam-pipe by the shank H in the usual manner, and the passage K K fills with steam, steam also passing through the passage K' and filling the sight-feed glass G. The steam also passes by means of the small tube K³ into the air-chamber A, where condensation begins, which is further carried on in the condensing-chamber C, which is formed in the top of the cup. The water of condensation is admitted to the oil-reservoir by means of the valve V, and is conveyed to the bottom of the oil-reservoir R by the tube V². The oil in the cup or reservoir, being floated upward by the entering water, seeks an outlet at the top of the cup, which is provided by the small passage F, which conveys it to the interior fitting E, and then to the regulating-valve F², by means of which oil is delivered drop by drop, or faster, if desired, through the glass tube G into the steam-passage K' K, and so into the part to be lubricated.

By the construction of the condensing-chamber C, as shown, a large surface is exposed, which facilitates the condensation, and this surface cannot be cut off by the oil rising to the top of the cup. Neither is it possible for water or steam to find entrance to the passage F as long as any oil remains in the oil-reservoir. The bracket-extension A³ on one side of the reservoir is provided for the purpose of attaching the lubricator to a steam-pipe or to the side of a wall, or fastening it upon any part of an engine or building, as it might be necessary to do in active service.

Having thus described our invention, what we claim, and desire to secure by Letters Patent, is—

1. In a displacement-lubricator, the combination, with the oil-cup having a condensing-chamber in its upper end formed between two walls, of the dome A, communicating with the said condensing-chamber and provided with means, as screw-plug A', having groove in its side to permit the escape of the air which may accumulate therein, substantially as set forth.

2. The combination, with the cup having the chamber C in its upper end, of the nipple P', extended through the said chamber and screwed into the inner wall and having its upper end flared and provided with an outer flange to overlap the outer wall of the said chamber, and the plug P, screwed into the lower end of the nipple, substantially as and for the purpose described.

3. The combination, with the cup having the chamber C in its upper end, of the valve-casing V', extending across said chamber and screwed into the inner wall and having an outer flange to overlap the outer wall and having communication with the said chamber through an opening, as $v$, and a hand-controlled valve adapted to close the lower end of the said casing, substantially as described.

4. In a displacement-lubricator, the combination of the oil-cup having a condensing-chamber at its upper end and provided with the passage K at one side and on the bottom and having the lugs L and L', which communicate with the said passage K, the sight-glass G between the lugs L and L', and the couplings connecting the ends of the sight-glass with the said lugs, substantially as and for the purpose described.

5. The combination, with the cup, the sight-glass, the fitting having an extension, as $e$, and the valve-stem having an enlargement $J^2$, of the valve having its rod inserted in an opening in the said stem, the pin $n$, collar N, and spring $N^2$, substantially as and for the purpose described.

6. The combination, with the cup having a lug, as L, the sight-glass, and means, substantially as described, for connecting the lower end of the sight-glass with the cup, of the fittings, as E and E', connecting the upper end of the said sight-glass with the lug L, the fitting E, inserted in the lug and having an exterior flange at its upper end, and the fitting E', screwed on the other end of fitting E against the lug, substantially as shown, and for the purpose set forth.

7. The combination, with the cup having lug $L^2$, the gage-glass, means for connecting the lower end of the gage-glass with the cup, and the fitting B, inserted in lug $L^2$, of the screw T', plug $B^2$, and collar $b^2$, substantially as and for the purpose described.

8. The combination, with the cup having lug $L^3$, the gage-glass, and means for connecting the upper end of the glass with the cup, of the fitting B', and the screw-plug $T^2$, having an extension which passes through said fitting B' and supports the said gage-glass, substantially as set forth.

9. The combination, with the cup having fitting B and the gage-glass, and means for connecting the lower end of the gage-glass with the cup, of the plug $B^2$, the stool $s$, the packing, and the collar $b^2$, substantially as set forth.

10. The combination, with the oil-cup having passage O and fittings $L^2$ and $L^3$, the gage-glass, and suitable fittings for connecting the said glass with the fittings $L^2$ and $L^3$, of the screw-plug $B^2$, having an extension which is projected within the said glass, substantially as and for the purpose described.

In testimony whereof we affix our signatures in presence of two witnesses.

WILLIAM F. MATTES.
JOHN F. LEWIS.

Witnesses:
W. L. JONES,
C. L. KIRKPATRICK.